US00RE34573E

United States Patent [19]

Calvert

[11] E Patent Number: Re. 34,573

[45] Reissued Date of Patent: Apr. 5, 1994

[54] LIQUID-CUSHIONED OUTERWEAR

[75] Inventor: Nathaniel Calvert, Rochester, Minn.

[73] Assignee: InMotion, Inc., Minneapolis, Minn.

[21] Appl. No.: 924,337

[22] Filed: Jul. 31, 1992

Related U.S. Patent Documents

Reissue of:

[64] Patent No.: 4,945,571
Issued: Aug. 7, 1990
Appl. No.: 249,334
Filed: Sep. 26, 1988

[51] Int. Cl.[5] ..... A41D 1/08; A41D 19/00

[52] U.S. Cl. ..... 2/2; 2/20; 2/228; 2/161.1; 2/267

[58] Field of Search ..... 2/DIG. 1, DIG. 5, 227, 2/228, 238, 231, 214, 401, 267, 411, 413, 2, 78 B, 82, 159, 161 R, 161 A, 164, 167, 17, 20; 36/44; 5/449, 451, 461

[56] References Cited

U.S. PATENT DOCUMENTS

| | | | |
|---|---|---|---|
| 549,048 | 10/1885 | Basch | 2/227 |
| 585,210 | 6/1897 | Isaacs | 2/227 |
| 3,508,550 | 4/1970 | Vollrath | 128/295 |
| 3,849,801 | 11/1974 | Holt et al. | 2/3 |
| 3,909,847 | 10/1975 | Holt et al. | 2/2 |
| 4,123,855 | 11/1978 | Thedford | 36/44 |
| 4,370,754 | 2/1983 | Donzis | 2/2 |
| 4,420,843 | 12/1983 | Genzling et al. | 2/161 |
| 4,471,538 | 9/1984 | Pomeranz et al. | 36/28 |
| 4,573,216 | 3/1986 | Wortberg | 2/2 |
| 4,747,163 | 5/1988 | Dzierson | 2/161 |
| 4,788,972 | 12/1988 | DeBusk | 2/DIG. 1 X |
| 4,805,243 | 2/1989 | Gibbens et al. | 2/228 |

*Primary Examiner*—Clifford D. Crowder
*Assistant Examiner*—Sara M. Current
*Attorney, Agent, or Firm*—Westman, Champlin & Kelly

[57] ABSTRACT

Clothing items including at least one sewn-in liquid cushioned bladder conforming to one or more pressure points experiencing friction or repeated shocks. Distributed through vents and sealed islands define one or more endless channelways to facilitate moisture transfer and assure even liquid distribution with body movement. Associated vented, wicking coverings transfer perspiration away from the bladder and wearer. Preferred embodiments include pantswear, gloves and an improved bladder containing seat cushion.

29 Claims, 5 Drawing Sheets

LIQUID-CUSHIONED OUTERWEAR

Matter enclosed in heavy brackets [ ] appears in the original patent but forms no part of this reissue specification; matter printed in italics indicates the additions made by reissue.

BACKGROUND OF THE INVENTION

The present invention relates to sportswear and, in particular, to an improved liquid bladder containing bicycle seat cover and padded pantswear and gloves for the bicyclist, among a variety of end users.

Depending upon an individual's vocation (e.g. working on an assembly line or driving a truck), or preferred leisure activities (e.g. riding a bicycle, motorcycle or horse, rowing a boat or sailing), participation requires physical contact between the participant and a work object or work piece with dynamic points of friction and shock occurring therebetween. These points of contact or pressure points and the resultant heat and stress can over time produce muscle fatigue, pressure sores, blistering, numbness, reduced blood circulation and/or tissue damage, all of which detract from the participant's enjoyment and performance. Longer lasting injuries may also result, such as has been experienced by workers in the auto industry or in the sport of tennis or baseball, among others, where carpale tunnel syndrome has developed in the arms and hands of a number of individuals.

For the sport of bicycling and of which Applicant is particularly aware, pressure points occur at the hands with the grasping of the handlebars and at the buttocks and inner thighs with sitting on the bicycle seat. Over time, with dynamic changes in road condition, such as transmitted vibrations and bumps and/or varying cyclist movement, the relatively minute and localized heat buildup and jarrings at each contact point can progressively worsen to oftentimes produce blistering and soreness.

Although a variety of cushioning materials may be positioned between the rider and bike to distribute the contact forces over a broader contact area, they provide only temporary relief, since all encountered forces are not directed perpendicular to the rider. That is, a lateral or shear component also exists which is not particularly negated or alleviated with most foam or non-flotational cushioning materials, since these materials provide more flex in the transverse direction than in the lateral direction. In particular, the rising and falling of the thighs relative to the seat pommel or the lateral oscillating movement of the buttocks across the bicycle seat produces friction which is not alleviated by a non-flotational cushioning material. A hydraulic flotational cushioning or artificial blister is therefore preferred which not only accommodates orthogonal cushioning forces, but also lateral shear forces. A hydraulic cushioning also improves blood flow by providing a greater area of pressure contact, while a non-flotational cushion allows a non-distributed contact with nerve compression and blood acclusion. Skin ulceration, tissue damage and numbness are particularly alleviated with a properly designed flotation cushion.

In the latter regard, Applicant in his U.S. Pat. No. 4,504,089 discloses a bladder containing bicycle seat cushion including a chamber configured to meet with the primary contact areas at the buttocks and thighs. Sealed, discontinuous shaped voids are provided for cushioning, but which shapes have been found to be disruptive of liquid flow and therefore less effective than an uninterrupted or an endless cavity of a more circuitous construction. The use of a non-porous bladder material has also shown the necessity of providing a perspiration venting arrangement to reduce the build-up of perspiration which can accentuate blistering, if undeterred.

Applicant has also determined that by directly including an improved bladder in the rider's pantswear, advantages can be obtained, even if a seat cushion is not used. Such a cushion may also be designed to fit the contact points directly, regardless if a seat cushion is used. Sewing or attaching the cushion to the clothing about its periphery also prevents bunching or cushion movement.

Appreciating further that the rider not only experiences frictional contact with the seat, but also with the handlebars, Applicant has sought to reduce stress to the forearms and hands across the palm area with improved handwear. Such a flotation cushion including glove also finds advantage with other work and recreation gloves for gripping a steering wheel, golf club, baseball bat, weight lifting equipment, hammer or jack hammer. Regardless of a wearer's grip, it is in this region that the primary gripping forces are encountered. Thus, an improved glove equalizes pressure over the gripping area and improves blood circulation.

Heretofore, Applicant is aware only of the use of foam or other rigid glove cushioning materials but which, again, do not alleviate lateral shear forces as effectively as the present liquid-filled cushion.

SUMMARY OF THE INVENTION

Appreciating the shortcomings of Applicant's earlier issued patent and the variety of vocational and leisure activities which engender friction/shock producing contact with a work object, Applicant, by way of the present invention, seeks to disclose exemplary outerwear including appropriately configured hydro-static cushions to cushion and distribute contact forces and alleviate lateral shear forces at localized pressure points.

It is accordingly a primary object of the present invention to provide a liquid-filled bladder which accommodates a sewn or permanently fixed mounting and whereby one or more bladders may be mounted to a variety of clothing items intermediate contact or pressure points between the body and a work object.

It is a further object of the invention to provide for a bladder construction wherein each filled chamber provides for an endless circuitous liquid chamber.

It is a further object of the invention to provide bladders having one or more evacuated voids positioned interiorly of filled chambers.

It is a further object of the invention to provide a bladder including a plurality of vented ports, which may occur at the voids, for directing air flow and the passage of perspiration moisture.

It is still further object of the invention to provide for a moisture absorbent, wick acting, cover member for directing perspiration away from the bladder.

It is another object of the invention to provide for a seat cushion bladder having a multiplicity of endless and uninterrupted channelways.

Various of the foregoing objects, advantages and distinctions of the invention are particularly achieved in an improved seat cushion construction and two alternatively configured embodiments of a pair of bicycle riding pants or shorts and a pair of riding gloves. The pantswear particularly includes a vented, multi-chambered construction with one or more endless liquid channelways which is mounted intermediate the outer shell of the pants material and covering layers of liner and absorbent cover materials with a vented wicking cover on an inner surface. The configuration of the bladder is adapted to the rider's crotch and zone of frictional contact with the bicycle seat, although the wicking cover extends over a larger area.

In an alternative glove construction, a pair of elongated bladders are sewn to the glove palm to diagonally extend from the heal of the palm to the crotch formed in the space between the thumb and index finger. An associated layer of liner material directs perspiration away from the palm and provides a slippery interface between the hand and bladders. A vented back panel permits wiping perspiration from the body.

In an improved seat cushion, one or more segmented regions including at least one endless channelway are formed adjacent an uninterrupted end chamber. Interior voids in the endless channelways assure even liquid distribution relative to body contact. The bladder is also secured to a foam support cushion beneath a cloth cover to minimize heat buildup and further reduce shock.

The foregoing objects, advantages and distinctions of the invention, among others, as well as a detailed description of its various constructions follows hereinafter with respect to the appended drawings. The description should however not be interpreted in limitation of the spirit and scope of the invention, but rather it is intended to be illustrative only of various presently considered alternative embodiments. To the extent modifications or other improvements might have been considered thereto, they are described as appropriate.

DESCRIPTION OF THE PREFERRED EMBODIMENT

Figure 1:
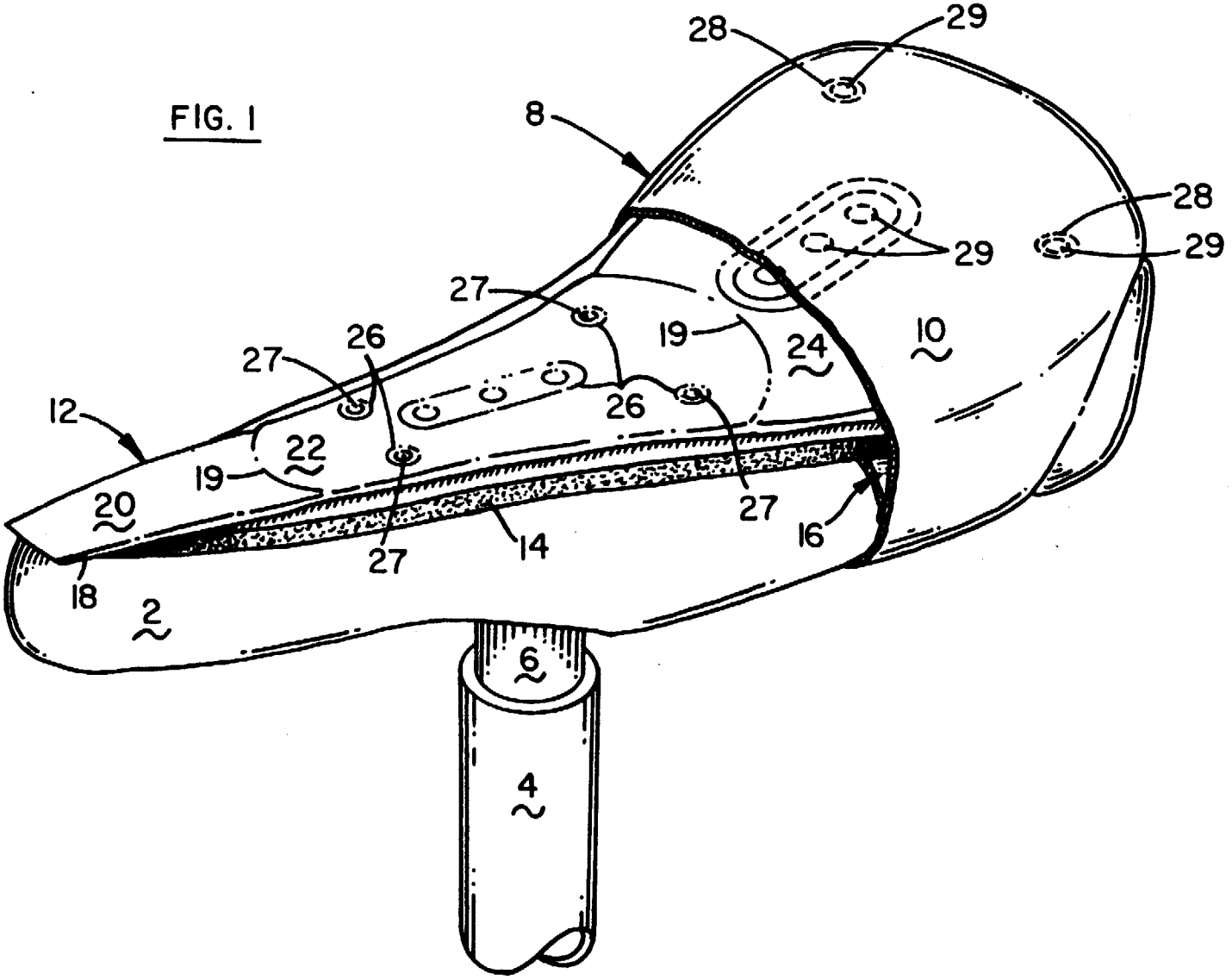
FIG. 1 shows an isometric view in cutaway of a typical bicycle seat with an improved bladder-containing cushion/cover mounted thereover.

Referring to FIG. 1, an isometric view is shown of a typical hard, bicycle seat 2 which is supported in height adjustable relation to a tubular member 4 extending upward from the bike frame via an intermediate tubular stem 6. The position of the seat 2 is adjustable up or down by appropriately releasing/tightening a compressive fastener (not shown) which secured the stem 6 at a desired extension from the frame 4. Another fastener assembly mounted beneath the hardened outer seat surface 2 (not shown) provides for a compressive yoke mounting to the upper end of the stem 6 and whereby the seat 2 may be tilted fore or aft. Although too the seat 2 is shown of a construction such as might be found on most 10-speed bicycles and where a relatively narrow profile is desired, the buttock supporting portion of the seat might be widened to more directly support the buttocks.

Mounted over the seat 2 is a cover assembly 8 which includes a fabric cover 10 whose lower peripheral edges include an elasticized member (not shown) that mounts in the peripheral hem to draw the cover 10 tightly about the seat 2. Mounted beneath the cover 10 in sequential order are a liquid bladder 12 containing one or more heat-sealed regions which is seen about its periphery to a foam support pad 14. The combined bladder 12 and pad 14 are mounted beneath a fabric pocket 16 which is sewn between the lateral sides of the cover member 10.

Although a pocket 16 is depicted, it is to be appreciated the pocket 16 may be deleted, provided the foam pad 14 does not shift about the seat 2. This may be achieved by sewing the pad 14 and/or bladder 12 to the cover 10 or securing the pad 14 to the seat. That is, the pocket 16 assures that the combined pad 14 and bladder 12 are rigidly secured relative to the cover 10 and seat 2 so that over time, the cushion assembly 8 does not rotate from side-to-side or otherwise bunch up. Where a pocket 16 is not employed, the lower surface of the pad 14 might be roughened or adhesively bonded to the seat 2 in non-movable relation. Alternatively, Velcro TM brand fastener material might be used or another suitable fastener/adhesive to secure the pad 14 to the seat.

Otherwise, the bladder 12 is sewn directly to the similarly configured pad 14, along the peripheral edges of the bladder 12. Specifically, the stitching occurs in the region of a heat sealed peripheral edge flap 18 which extends about the bladder 12, where the upper and lower layers of bladder material are bonded together. Alternatively, the bladder 12 might also be heat sealed to the pad 14 along the peripheral flap 18.

Otherwise and depending upon the size to the seat 2, the bladder 12 is segmented into a number of principle support regions 20, 22, and 24. Although three regions are shown, normally the end region 24 is only required for large seat constructions such as used in exercisers. Otherwise, a typical 10 speed bike seat only uses regions 20 and 22. In any case, the forward region 20 covers the smallest area of the seat 2 and aligns with the forward portion of the seat pommel. The chamber 20 is of an uninterrupted construction such that any body weight brought to bear thereagainst causes the upper the lower bladder layers to compress, with the liquid being distributed to other regions of the chamber. Generally, however, no particular weight is supported at this region.

The middle region 22 is fabricated in an elongated construction which principally contacts the inner thighs of the rider. A number of voids 26 are provided at the center and about the edges of this region and whereat the upper and lower bladder layers are sealed to one another. Each void also includes one or more holes 27. Thus the voids 26 act as islands to create endless, surrounding channelways. As rider contact is made with the bladder 12, the liquid is distributed about the channelways to other areas of the region and thereby provides a dynamic support action with a continual redistribution of the liquid occurring from the reciprocal thigh movement. Perspiration and built-up moisture are channeled through the vent holes 27.

Lastly, the rear chamber 24 aligns with the rider's buttocks and similarly includes a center and a number of surrounding vented voids 28 which define a plurality of interconnecting endless channelways that act in the same fashion as the channelways of the region 22. As the rider's weight is redistributed from one to the other of the buttocks, the liquid is redistributed about the region 24. Bunching of the liquid at any particular seat region is thus eliminated. Holes 29 formed in the voids 28 again provide venting which is especially important for the larger size bladder 12.

In the latter regard and although described for a bicycle seat, still other bladder constructions can be formed by sealing off a number of regions of a liquid-filled pair of bladder layers. Each of these regions may, in turn, include one or more vented or unvented voids. Some examples of these latter cushions might be for wheelchair seats or motor vehicle cushions, among other applications.

In contrast to the foregoing cushion construction, Applicant's U.S. Pat. No. 4,504,089 discloses a single buttock and thigh supporting bladder having a center restriction or void which extends through substantially the center of the bladder. Although liquid redistribution occurs with movement, because the channelway is not of an endless construction, quantities of the liquid can become trapped in disadvantageous regions of the bladder. In the embodiment of the present FIG. 1, however, the inclusion of a plurality of endless circuitous channelways at each region 22,24 assures that such a trapping cannot occur. Moreover, the present cushion 12 is supportable from the foam support pad 14 to provide still further cushioning to the rider. A composite cushion accommodating orthogontal shock and lateral shear forces is thus obtained and whereby heat build-up from friction is reduced.

Figure 2:
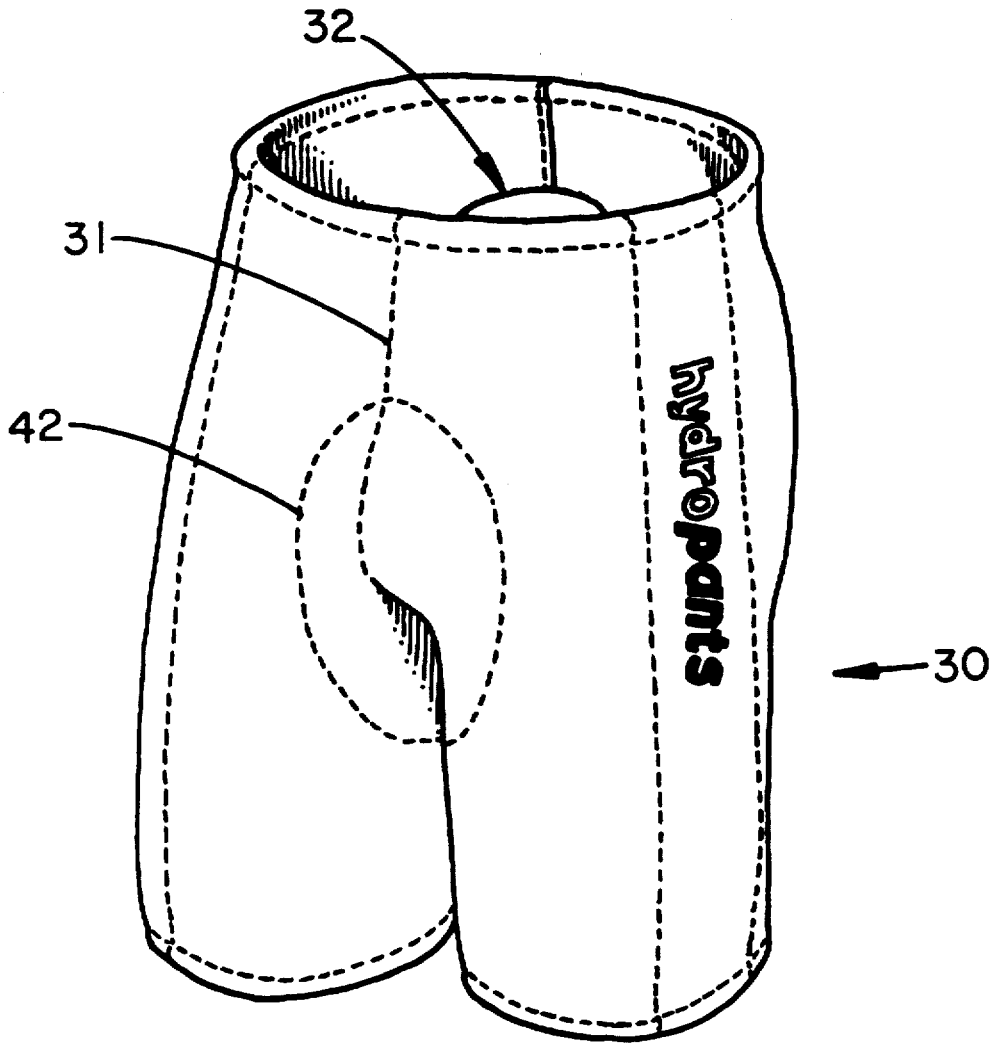
FIG. 2 shows an isometric view of a typical pair of riding shorts including the invention.

Turning attention next to FIG. 2, an isometric view is shown of a pair of bicycling shorts 30, which are typically made from a Lycra TM brand or cotton material. Such shorts are typically designed to be tight fitting about the wearer to minimize wind drag, yet flex with normal pedaling movements. Moreover, such a material facilitates perspiration transfer.

Although a pair of riding shorts 30 are shown, it is to be appreciated long pants or a variety of other pantswear from horse riding pants to shorts for sculling to a variety of other outerwear or underwear garments might also be modified in a similar fashion to that described hereinafter with respect to the riding shorts 30.

In any event, sewn into the buttocks and crotch area of the shorts 30, along a center seam 31, is a liquid-filled cushion insert 32. The insert 32 is included to cushion the pressure points which occur at the rider's thighs and buttocks relative to a seat 2. Although the shorts 30 may be used alone, they can be combined with the above described seat cushion 8 of FIG. 1 to maximize rider protection from blistering and fatigue. The placement and particular construction of the cushion 32 relative to the shorts 30 may best be seen from FIG. 3.

There, an exploded assembly view is shown of the cushion 32 relative to the inner surface of the pants 30 and the seam 31. In particular the cushion 32 comprises a plurality of layers of material selected to facilitate perspiration wickage and maintain the cushion 32 in a permanent relative placement to the pants 30. A liquid bladder 34 is mounted to cover the ischial crest or the "sitbone" of the bicyclist's hip and rests on the bicycle seat during normal seated operation. Whereas the pants material massages the muscles and minimizes friction between the thighs and bike seat, the bladder 34 minimizes friction with the rider's skin by way of interjecting a constrained, liquid between the seat 2 and the rider's inner thighs and buttocks. That is, the liquid bladder acts to distribute the contact forces over a larger surface area of the bicyclist using materials exhibiting relatively low lateral shear forces to otherwise alleviate heat build-up with lateral frictional movement between the thighs and seat cushion.

As mounted, the liquid-filled cushion assembly 32 is sewn to the inner surface 35 of the pants material and comprises a number of layers which not only protect the bladder 34, but transfer perspiration moisture away from the region of the cushion 34 as it develops over time. The liquid cushion 34, which is constructed of overlying layers of a polyurethane material, as with the bladders 12, is filled with a suitable liquid which may comprise water, or a non-freezable silicon or glycerin or mixtures thereof, among a variety of other types of liquids. A variety of oils or other slippery materials might equally be employed.

Solid materials such as foam and other elastomers are however to be avoided as flotation fillers, since although providing an orthogonal support component, such materials exhibit a higher inherent lateral shear force. Consequently, repeated up/down movements of the thighs relative to the seat produce a progressively increasing frictional contact which over time can induce muscle fatigue, soreness and blistering. Road vibrations similarly transfer micro and macro shock components to the buttocks and hands of the bicyclist by way of the seat and handlebars which require a material having both perpendicular and lateral cushioning properties.

The perpendicular component of such shocks is softened as the liquid of the bladder 34 is displaced away from the pressure points between the rider and seat to adjacent areas. Also, because not all of the liquid is displaced and because the bladder walls are constructed of inherently slippery materials, a slippery interface occurs in the region between the upper and lower layers of the bladder 34 to reduce the lateral shear forces. Where a seatcover bladder 12 and a pants bladder 34 are used, not only is the cushioning increased but also the slip capabilities.

Surrounding the bladder 34 are a pair of fabric liner layers 36 and 40, typically a velour or thin open weave cover material. They generally protect the bladder 34 blunt any ridges formed at the heat seal to provide a slippery moisture transfer interface between the further coverings which include upper and lower, moisture absorbing cotton layers 38 and 42.

The layers 38 and 42 are typically cut from a terry cloth material or some other economical, porous, highly absorbent material. Perspiration which develops from the placement of the impermeable cushion 34 relative to the cyclist is absorbed by the layers 38 and 42 and transferred away from the cyclist to the pants material 35.

A vented wicking layer 43, lastly, covers the cushion insert 34. It is constructed of a chamois, ultra-suede or soft leather material and includes a plurality of vent holes 44 which are let into anterior and posterior sections 45 and 47. The anterior vent holes, particularly allow air to pass over the wearer, while the anterior portion also serves as a lining. Note, for some embodiments (i.e. undergarments) the anterior section 45 may not be required. Otherwise, the posterior vent holes allow sweat to collect on the absorbent layer 38 which is in part transferred by the vent holes 54 and associated layers 40, 36 and 42 away from the wearer. If the vent holes were not provided, the sweat could not migrate, thus causing a salt build-up, with consequent abrasion, chaffing, blisters and tissue damage.

The wicking layer 43 is sewn over and to the layered cushion assembly 32, which in turn is sewn to the shorts 30. Thus, the bladder 34 and layers 36–42 are sewn to each other to form a composite assembly which is secured to the pants to prevent bunching of any ones of the layers or liquid.

The wicking layer 43 is also cut to provide a longer oblong construction to not only cover the cushion assembly 32 but also extend from a point approximately above the buttocks on the rear of the pants 30 to a point above the crotch on the front of the pants 30. With the diffusion of perspiration to the wicking layer 43 and with the passage of air thereover by way of the vent holes 44 and 54, moisture is also allowed to evaporate. The inclusion of an otherwise non-breathing bladder 34 thus becomes possible and improves ride comfort.

In the latter regard, it is to be noted that the bladder 34 is cut to an elongated configuration with a narrow forward region 50 aligning with the thighs and a rear region 52 aligning with the buttocks which are separated by a heat seal line 53. Bladder size is minimized to reduce perspiration, yet still provide sufficient rider contact with the seat. A similar construction is replicated in the seat bladder 12 of FIG. 1 for a 10-speed bicycle seat cushion 8.

Figure 3:
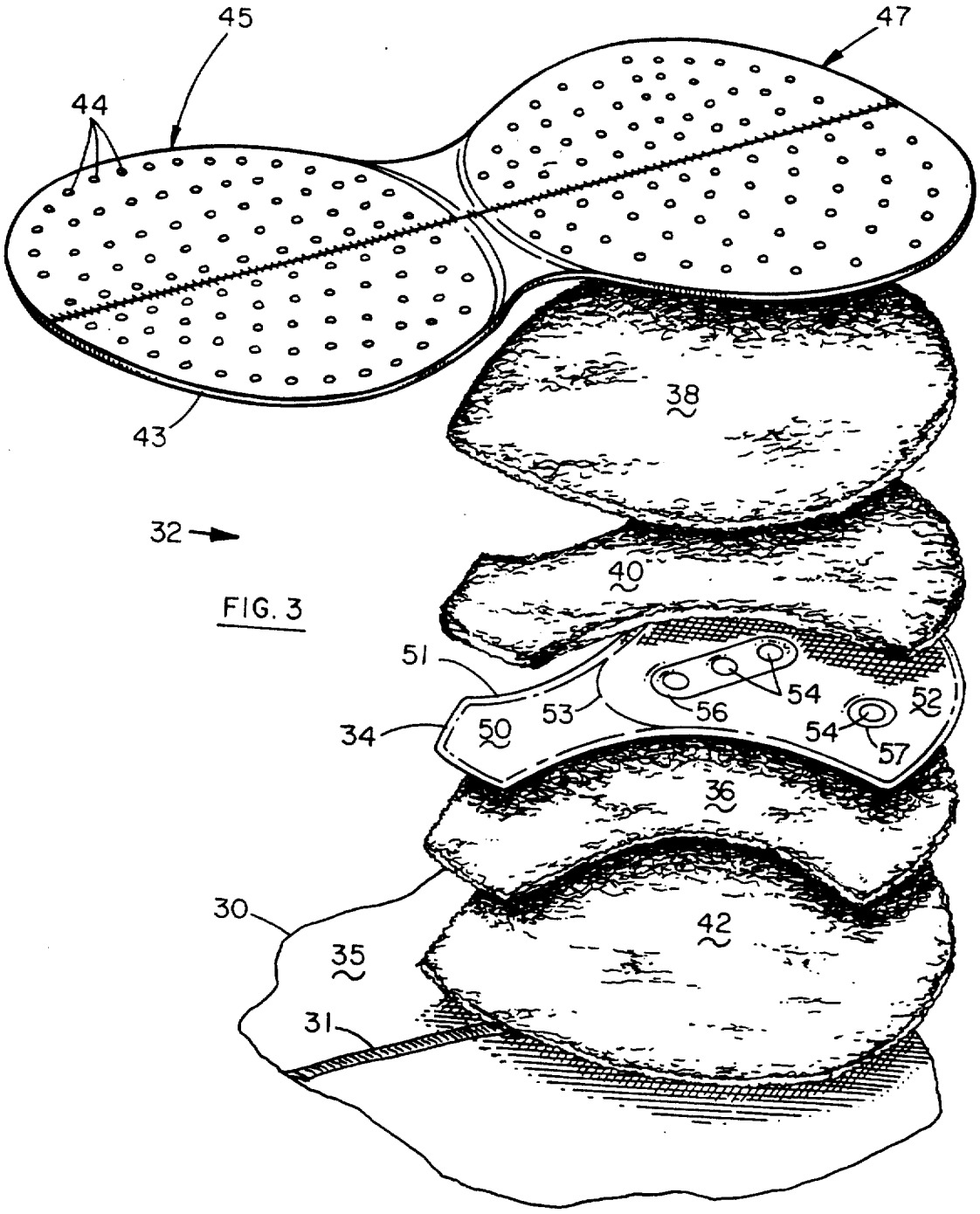
FIG. 3 shows an isometric view of the shorts of FIG. 1 in exploded assembly to expose the liquid-filled bladder, liner and wicking members.

Also apparent from FIG. 3 are a plurality of vent holes 54 which are formed through the bladder 34. At present, three vent holes 54 occur at a center void 56 and at sealed voids 57 at each of the rear corners. A number of vented islands are thus created within the region 52. Each however is surrounded by an endless liquid channelway which assures that the liquid is merely displaced about the bladder as contact is made therewith, as opposed to being directed into closed ends, such as is possible with Applicant's earlier seat cushion.

Also apparent is the continuous peripheral edge seal 51 where the two layers of cushion material are heat sealed to one another, as at the interior seal 53 which separates the regions 50, 52 from one another. Although heat sealing is presently used, depending upon the material, other sealing operations may be used.

Figure 4:
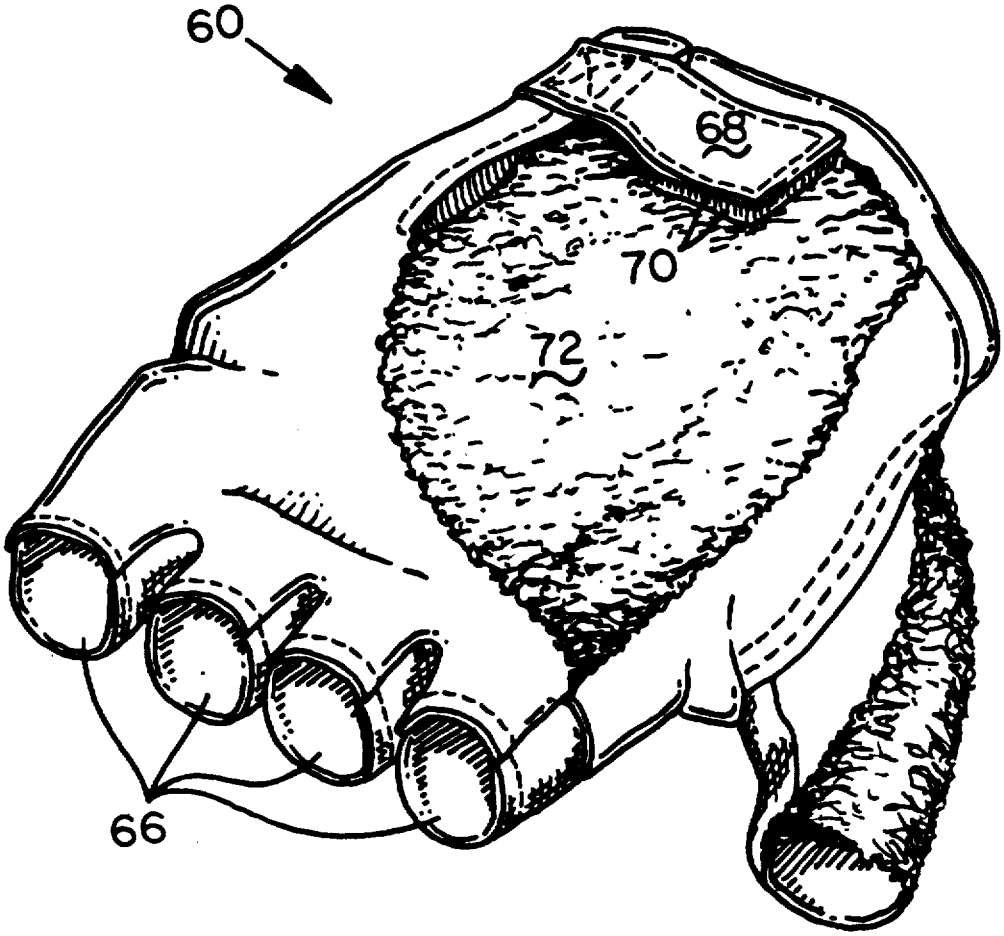
FIG. 4 shows an isometric view of one of a pair of riding gloves including a pair of liquid-filled bladders.
Figure 5:
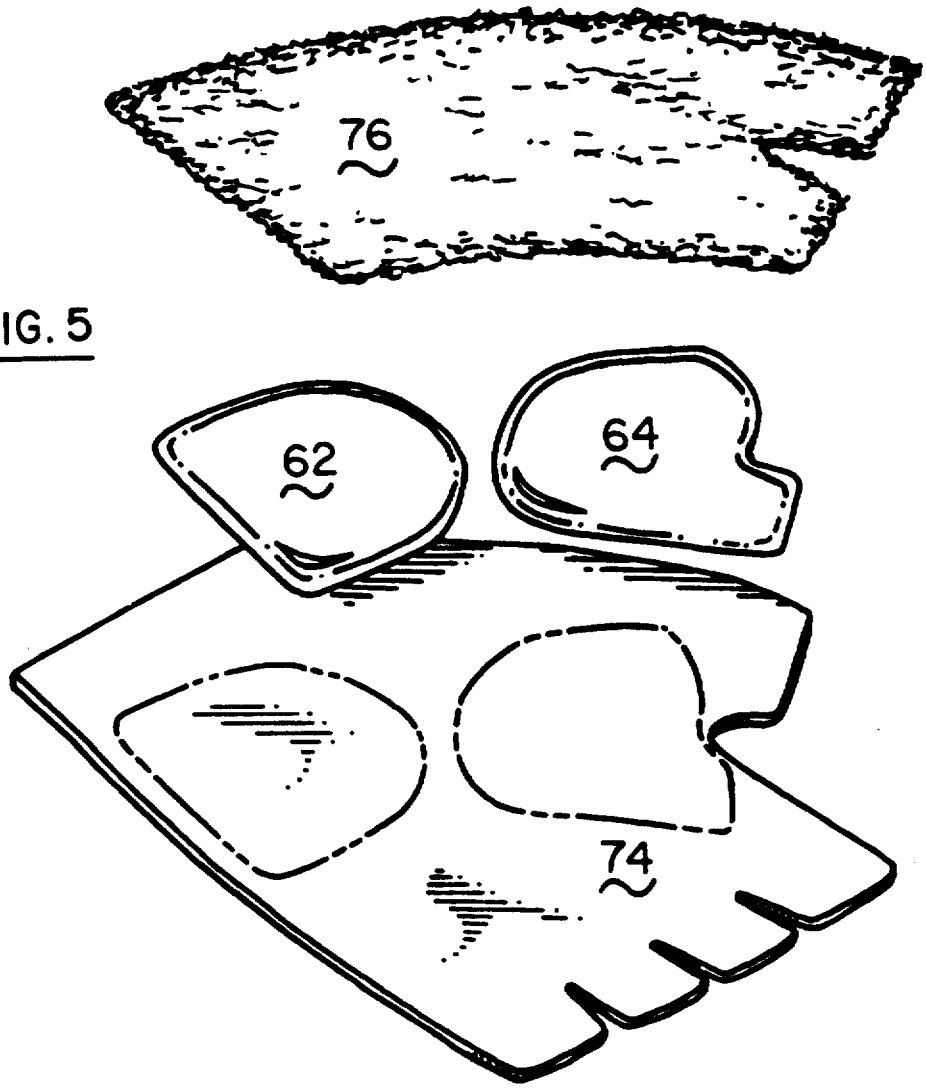
FIG. 5 shows an exploded assembly view of the front panel construction of the glove of FIG. 4.

FIGS. 4 and 5, lastly disclose a glove construction 60 which incorporate a pair of liquid-filled bladders 62 and 64 into the palm area of each glove 60 relative to the cyclist. As apparent from the rear view of FIG. 4, each glove 60 provides for a number of tipless finger and thumb holes 66. A strap 68 and mating fasteners 70, 35 typically formed from a Velcro TM brand material, provide an adjustable fitting of the glove 60 to the hand. An absorbent cloth insert 72 sewn into the glove back also enables wiping perspiration from the face, etc.

Otherwise, FIG. 5 shows an exploded view of the palm forming panel 74 and liquid-filled bladders 62 and 64 which are sewn into each glove palm intermediate the heel of the palm and the crotch area between the thumb and index finger. Support is thus obtained diagonally across the palm surface which accommodates either holding the center horizontal portion of the handlebars or the curved, outer ends of the bars. Vibrational and lateral shear forces are thereby alleviated to the hands as with the bladders 12 and 34 for the thighs and buttocks.

Separate bladders 62 and 64 are used to assure that normal finger and knuckle movement aren't affected. By also placing the bladders to separately align with the heel and crotch areas, different types of normal gripping actions are accommodated. As mentioned, such a glove may also be used with a variety of vocations to prevent carpale tunnel syndrome.

Also apparent in FIG. 5 is a fabric liner 76 which covers each bladder 62 and 64. The liner 76 is principally intended to provide a slippery breathable interface between the hand and bladders 62, 64. Some moisture transfer is also obtained, even though a highly absorbent material such as provided by the layers [40] *38* and 42 of FIG. 3 is not presently used. Also, while vented voids are not shown, it is to be appreciated they might be added as necessary. Similarly, each bladder may be segmented with the addition of one or more interior heat seal lines.

While the present invention has been described with respect to its presently preferred and various alternative embodiments, it is to be appreciated still other embodiments might suggest themselves to those of skill and the art to the extent therefore various equivalent embodiments fall within the spirit and scope of the above-described invention, Applicant requests that the following claims be interpreted to so include such embodiments.

What is claimed is:

1. Clothing articles including a cushion secured to said clothing in a region intermediate a pressure contact point between the body of the wearer and an object contacting the clothing, wherein said cushion comprises:

(a) first and second liquid impermeable layers sealed to one another and filled with a viscous liquid to define a liquid filled chamber;

(b) third and fourth fabric layers covering and slideably mounting over said first and second layers;

(c) fifth and sixth absorbent layers covering said third and fourth layers; and (d) wherein said third, fourth, fifth and sixth layers are sewn to said first and second layers in the region of a seal between said first and second layers.

2. Apparatus as set forth in claim 1 wherein said liquid filled chamber include at least one sealed hole extending through said first and second impermeable layers for venting the cushion in the region of body placement.

3. Apparatus as set forth in claim 2 wherein an endless channelway is defined interiorly of said liquid-filled chamber about said hole.

4. Apparatus as set forth in claim 1 wherein said viscous liquid is selected from a group including water, silicon, oil and mixtures thereof.

5. Apparatus as set forth in claim 1 wherein said first and second impermeable layers comprise a polyurethane material sealed together to define a plurality of chambers and intermediate of each of which said liquid is disposed and wherein at least one chamber includes at least one island surrounded by an endless channelway whereat said first and second layers sealingly contact one another.

6. Apparatus as set forth in claim 5 wherein said island comprises a void and includes at least one vent hole formed through heat sealed first and second layers.

7. Apparatus as set forth in claim 1 including a seventh moisture wicking layer having a plurality of vent holes therethrough sewn to said clothing article in covering relation to said cushion.

8. Pantswear including a liquid-filled cushion insert mounted to the pantswear in the region of the buttocks between a plurality of layers, comprising a first moisture-absorbent layer mounted intermediate said cushion and the pantswear material, second and third fabric liner layers enveloping said cushion, a fourth moisture absorbent layer mounted over said third liner layer and a wicking layer mounted over said fourth absorbent layer and wherein at least said wicking layer is permanently secured to said pantswear material.

9. Apparatus as set forth in claim 8 wherein said wicking layer comprises a chamois material including a plurality of thru holes and wherein said material extends from a seat region of said pantswear downwardly and forwardly to a crotch region thereof.

10. Apparatus as set forth in claim 8 wherein said cushion insert is constructed from at least first and second layers of a polyurethane material and intermediate of which is sealably contained a liquid, said liquid being disposed in at least one chamber including at least one island where said first and second layers sealingly contact one another and surrounded by an endless channelway defined in said chamber.

11. A cushion for a clothing article comprising:

(a) first and second liquid impermeable layers [heat] sealed to one another and filled with a viscous liquid to define at least one liquid-filled chamber said chamber including at least one island whereat said first and second layers contact one another and include a vent hole;

(b) a moisture absorbent layer;

(c) a wicking layer; and (d) wherein said wicking layer is secured interiorly to said clothing article in covering relation to said liquid-filled chamber and said moisture absorbent layer, whereby moisture is transmitted via said wicking layer and said vent hole to said moisture absorbent layer and an outer surface of the clothing article for evaporation.

12. Apparatus as set forth in claim 11 wherein said cushion [is constructed from at least first and second layers of a polyurethane material and intermediate of which is sealingly contained a silicon based liquid, said liquid being disposed in] *has* a plurality of chambers wherein each chamber is sealed from each other and wherein at least one chamber includes at least one island, where said first and second layers sealingly contact one another, surrounded by an endless channelway defined in said at least one chamber.

13. Apparatus as set forth in claim 11 wherein said [working] *wicking* layer includes a plurality of apertures wherethrough air may pass to permit evaporation of absorbed moisture.

14. A glove having at least a portion covering the palm of the hand and including:

(a)first and second cushions, each cushion comprising first and second liquid impermeable layers sealed to one another in circumscribing relation to a viscous liquid;

(b) a cover member positioned over said first and second cushions and to the palm cover portion to secure said first and second cushions in displaced relation to one another;

(c) and wherein said first cushion is positioned to align with the heel of the hand and said second cushion is positioned to align with the region of the hand between the thumb and index finger and such that said first and second cushions do not contact one another during normal gripping movement of the hand.

15. Apparatus as set forth in claim 14 wherein said cover member comprises a moisture absorbent layer positioned interiorly of said glove.

*16. Apparatus as set forth in claim 12 wherein said liquid comprises a silicon based liquid.*

*17. Apparatus as set forth in claim 11 wherein said cushion includes a plurality of vent holes through the liquid-filled chamber.*

*18. A cushioning apparatus for a clothing article covering a body, the cushioning apparatus removing moisture from a surface of the body, the cushioning apparatus comprising:*

*(a) a liquid impermeable wall cushion engaging the clothing article and filled with a liquid to define at least one liquid-filled chamber having a vent hole therethrough; and*

*(b) a wicking layer in covering relation to the liquid-filled chamber, the wicking layer receiving moisture from the surface of the body and transferring the moisture to the vent hole.*

*19. The apparatus as set forth in claim 18 and a moisture absorbent layer in covering relation to the liquid-filled chamber on a side opposite that of the wicking layer, the moisture absorbent layer receiving moisture from the vent hole.*

*20. The apparatus as set forth in claim 19 wherein an edge of the moisture absorbent layer extends outwardly from a corresponding edge of the liquid impermeable wall cushion to receive moisture from the surface of the body.*

*21. The apparatus as set forth in claim 18 wherein the liquid impermeable wall cushion is sealed together to define a plurality of chambers and intermediate of each of which said liquid is disposed and wherein at least one chamber includes at least one island surrounded by an endless channelway whereby sealed layers of the liquid impermeable wall cushion contact one another.*

*22. The apparatus as set forth in claim 21 wherein at least one island comprises a void and includes the vent hole formed through sealed layers of the liquid impermeable wall cushion.*

*23. The apparatus as set forth in claim 18 wherein said wicking layer includes a plurality of apertures through which air may pass to permit evaporation of absorbed moisture.*

*24. The apparatus as set forth in claim 18 and an intermediate layer interposed between and in contact with the wicking layer and the liquid impermeable wall cushion.*

*25. The apparatus as set forth in claim 24 and a moisture absorbent layer in covering relation to the liquid-filled chamber on a side opposite that of the wicking layer, the moisture absorbent layer receiving moisture from the vent hole.*

*26. The apparatus as set forth in claim 25 wherein an edge of the moisture absorbent layer extends outwardly from a corresponding edge of the liquid impermeable wall cushion to receive moisture from the surface of the body.*

*27. The apparatus as set forth in claim 18 wherein said cushion includes a plurality of vent holes through the liquid-filled chamber of the liquid impermeable wall cushion.*

*28. A cushioning apparatus for a clothing article covering a body, the cushioning apparatus removing moisture from a surface of the body, the cushioning apparatus comprising:*

*(a) a liquid impermeable wall cushion engaging to the clothing article and filled with a liquid to define at*

*least one liquid filled chamber having a vent hole therethrough;*

(*b*) *a moisture absorbent layer in covering relation to the liquid-filled chamber; and*

(*c*) *a wicking layer in covering relation to the liquid-filled chamber on an outer surface of the liquid-filled chamber opposite the moisture absorbing layer, the wicking layer obtaining moisture from the surface of the body and transferring the moisture toward the vent hole so that the moisture passes through the vent hole to the moisture absorbent layer.*

*29. The apparatus as set forth in claim 28 wherein an edge of the moisture absorbent layer extends outwardly from a corresponding edge of the liquid impermeable wall cushion to receive moisture from the surface of the body.*

* * * * *